(12) United States Patent
Kirkbride

(10) Patent No.: US 11,198,512 B2
(45) Date of Patent: *Dec. 14, 2021

(54) SYSTEMS AND METHODS PROVIDING AIRFLOW WITHIN A VEHICLE

(71) Applicant: THE BOEING COMPANY, Chicago, IL (US)

(72) Inventor: David W. Kirkbride, Allyn, WA (US)

(73) Assignee: THE BOEING COMPANY, Chicago, IL (US)

( * ) Notice: Subject to any disclaimer, the term of this patent is extended or adjusted under 35 U.S.C. 154(b) by 108 days.

This patent is subject to a terminal disclaimer.

(21) Appl. No.: 16/803,221

(22) Filed: Feb. 27, 2020

(65) Prior Publication Data

US 2020/0189748 A1 Jun. 18, 2020

Related U.S. Application Data

(63) Continuation of application No. 15/817,359, filed on Nov. 20, 2017, now Pat. No. 10,618,660.

(51) Int. Cl.
*B64D 13/02* (2006.01)
*B64C 1/14* (2006.01)
*B64D 45/00* (2006.01)
*B64D 13/06* (2006.01)

(52) U.S. Cl.
CPC ............ *B64D 13/02* (2013.01); *B64C 1/1461* (2013.01); *B64C 1/1469* (2013.01); *B64D 45/0028* (2019.08); *B64D 2013/0625* (2013.01); *B64D 2013/0651* (2013.01); *B64D 2013/0655* (2013.01); *B64D 2013/0692* (2013.01)

(58) Field of Classification Search
CPC ........ B64D 45/0028; B64D 2013/0625; B64D 2013/0651; B64D 2013/0655; B64D 2013/0692; B64C 1/1461; B64C 1/1469
See application file for complete search history.

(56) References Cited

U.S. PATENT DOCUMENTS

| | | | | |
|---|---|---|---|---|
| 2003/0052227 A1* | 3/2003 | Pittman | ............... | B64C 1/1469 244/118.5 |
| 2005/0230550 A1* | 10/2005 | Dominguez | .......... | B64C 1/1469 244/129.5 |
| 2006/0258280 A1* | 11/2006 | Hagen | .................... | B60H 1/267 454/69 |
| 2007/0167126 A1* | 7/2007 | Ghattas | ................... | F24F 3/167 454/187 |
| 2010/0224726 A1* | 9/2010 | Lu | ......................... | F25D 23/006 244/118.5 |
| 2014/0248827 A1* | 9/2014 | Keleher | ................. | B64D 13/00 454/76 |
| 2016/0349015 A1* | 12/2016 | Wibby | ................... | B32B 27/12 |

* cited by examiner

*Primary Examiner* — Rodney A Bonnette
(74) *Attorney, Agent, or Firm* — The Small Patent Law Group LLC; Joseph M. Butscher

(57) ABSTRACT

Systems and methods provide airflow to a first area from a second area within a vehicle. The system includes a fan mounted within a door separating the first area from the second area. The fan is configured to direct airflow from the second area into the first area. The fan having a shield positioned adjacent to the second area that is configured to conceal the fan.

20 Claims, 5 Drawing Sheets

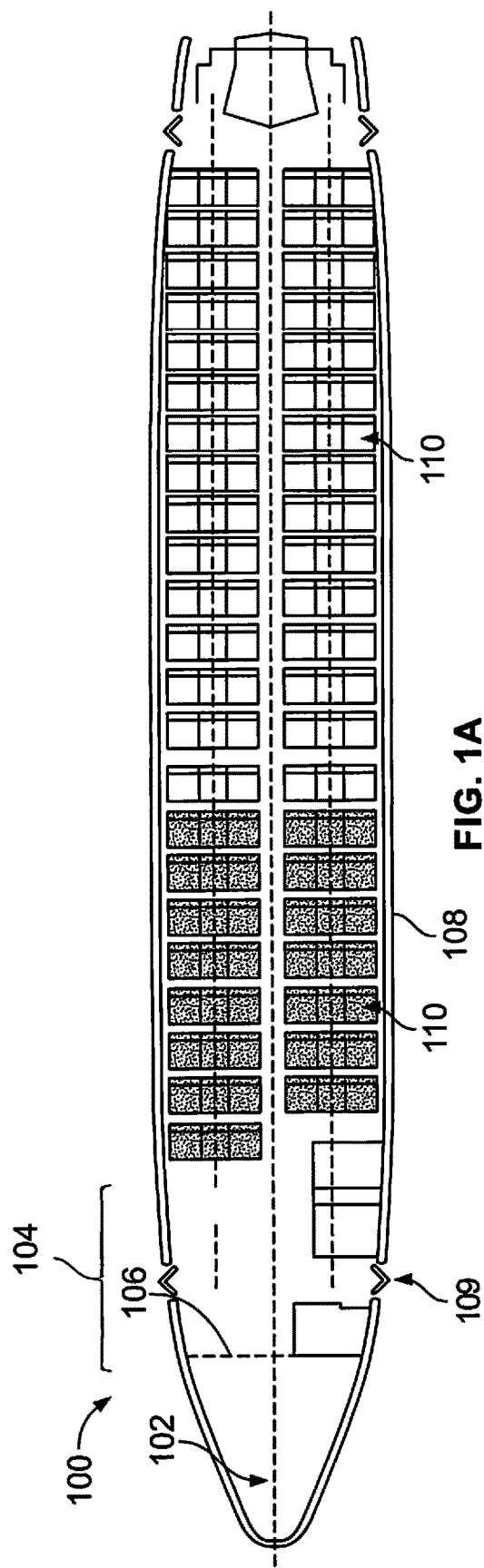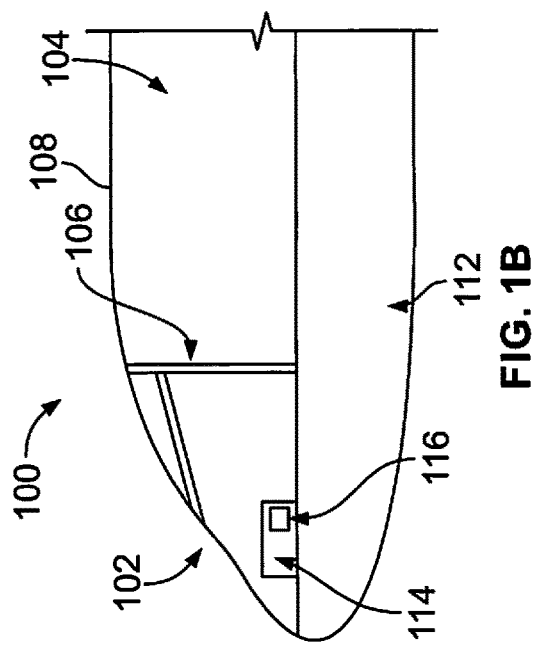
FIG. 1A
FIG. 1B

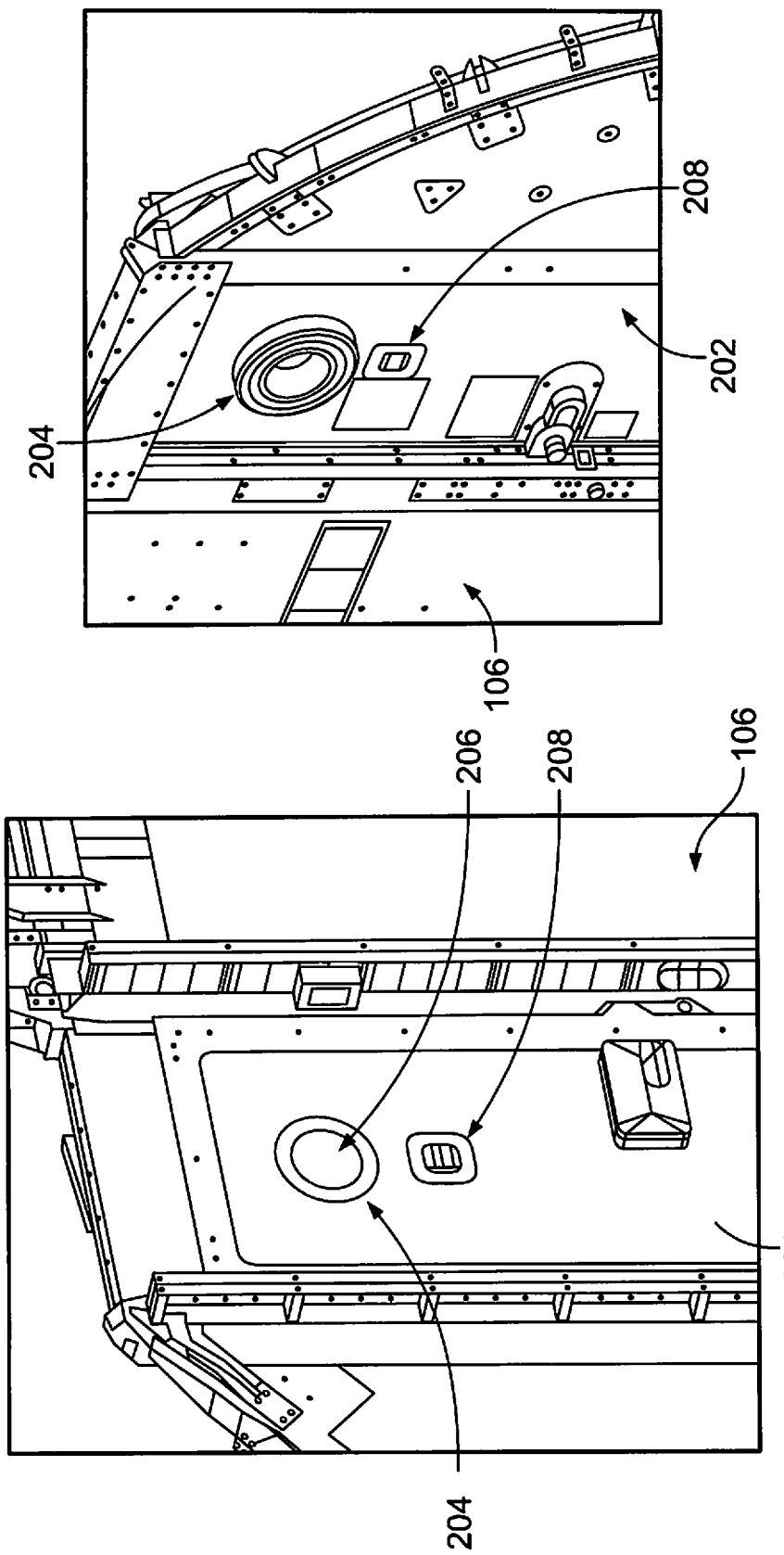

SYSTEMS AND METHODS PROVIDING AIRFLOW WITHIN A VEHICLE

RELATED APPLICATIONS

This application is a continuation of U.S. patent application Ser. No. 15/817,359, entitled "Systems and Methods for Providing Airflow to a Flight Deck," filed Nov. 20, 2017, now U.S. Pat. No. 10,618,660, which is hereby incorporated by reference in its entirety.

FIELD

Embodiments of the present disclosure generally relate to systems and methods for pressurizing a flight deck.

BACKGROUND

Commercial aircraft typically includes a flight deck within a cockpit, from which pilots control the aircraft. During operation of the aircraft, situations can occur within the flight deck that may degrade air quality within the flight deck.

SUMMARY

Embodiments of the present disclosure generally relate to systems and/or methods for pressurizing a flight deck to assure a positive pressure differential exists between the flight deck control volume and other air volumes within the airplane to assure air that design air flow and leakage air flows are in the out direction from the flight deck to assure that no smoke or toxic gases penetrate the flight deck from outside the flight deck sources.

Commercial aircraft are typically partitioned into control volumes with managed air flows from higher pressure control volumes to lower pressure control volumes. The flight deck from which pilots control the aircraft is one of these control volumes. During operation of the aircraft, situations can occur where air in a control volume may include smoke or other toxic gas.

A need exists for systems and/or methods for augmenting airflow into a flight deck of an aircraft to assure that the flight deck air pressure is maintained at a higher pressure to assure that out design air flows and leakage air flows are in the out direction from the flight deck. In normal operation the systems and/or methods are supplemental to the air management system of the airplane. If there are failures in the air management system of the airplane the systems and/or methods provide redundant pressurization for the flight deck.

With that need in mind, certain embodiments of the present disclosure provide airflow into a flight deck, such as from a fan. The fan is mounted within a door separating a flight deck from a passenger entry area. The passenger entry area correspond to a section of the aircraft representing an area the passenger enters the aircraft. The fan is configured to direct airflow from the passenger entry area into the flight deck. For example, a rotation of blades of the fan are configured to direct air from the passenger entry area into the flight deck. The fan includes a shield positioned adjacent to the passenger entry area that is configured to protect the fan from external projectiles. Optionally, the shield is a metal or one or more ceramic plates configured to absorb an impact or stop penetration of an external projectile into the fan.

In at least one embodiment, the airflow increases an air pressure within the flight deck. Optionally, the door includes a vent valve configured to adjust the air pressure within the flight deck.

In at least one embodiment, the fan includes a filter interposed between the shield and the fan within the door. The filter is configured to remove particles from the airflow. Optionally, the filter is a high efficiency particulate air filter (HEPA filter).

In at least one embodiment, the fan includes a light source configured to indicate at least one of operation of the fan, a status of a filter, or a condition within the flight deck.

In at least one embodiment, the fan is operably coupled to an environmental control system (ECS). The fan is activated based on instructions received from the ECS. Additionally or alternatively, the flight deck includes a user interface. The fan is activated based on instructions received from the user interface.

In at least one embodiment, a second fan is mounted within the door. The second fan is configured to direct airflow from the passenger entry area into the flight deck. The shield is configured to extend to the second fan and protect the second fan from external projectiles.

In at least one embodiment, the fan includes an elastomeric mount is configured to dampen sound emitted by the fan.

Certain embodiments of the present disclosure provide a method for providing airflow into the flight deck. The method includes mounting a fan within a door that separates a flight deck from a passenger entry area, and coupling a shield to conceal the fan. The shield is positioned adjacent to the passenger entry area. The method includes directing an airflow from the passenger entry area into the flight deck.

Certain embodiments of the present disclosure provide an aircraft. The aircraft includes an internal cabin. The internal cabin includes a flight deck and a passenger entry area. The internal cabin includes a door separating the flight deck from the passenger entry area. The door includes a fan. The fan is configured to direct airflow from the passenger entry area into the flight deck. The fan includes a shield positioned adjacent to the passenger entry area, which is configured to conceal the fan. The shield includes a metal or ceramic plate configured to absorb an impact or stop penetration of an external projectile into the fan. The fan includes a filter interposed between the shield and the fan. The filter is configured to remove particles from the airflow into the flight deck. The aircraft includes an environmental control system (ECS) that is operably coupled to the fan.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein:

FIG. 1A illustrates an internal view of a portion of an internal cabin of an aircraft, according to an embodiment of the present disclosure;

FIG. 1B illustrates a lateral internal view of a cabin of an aircraft, according to an embodiment of the present disclosure;

FIG. 2A illustrate an exterior view of a door relative a passenger entry area, according to an embodiment of the present disclosure;

FIG. 2B illustrates an interior view of a door relative to a flight deck, according to an embodiment of the present disclosure;

DETAILED DESCRIPTION

Figure 3:
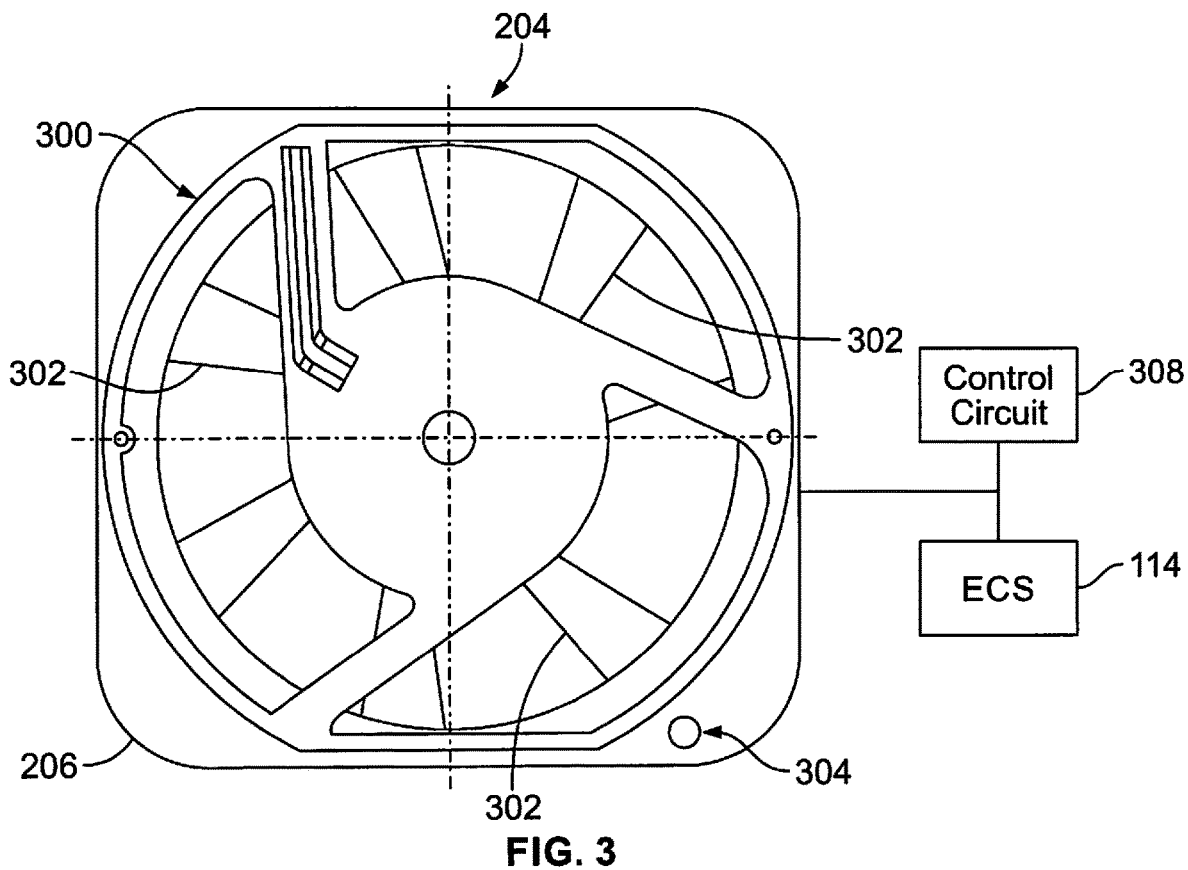
FIG. 3 illustrates a front view of a rotor assembly of a fan relative to a passenger entry area, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

The embodiments herein describe a fan configured to provide airflow into a flight deck of an aircraft. The fan is mounted within a door. The fan includes a rotor assembly having a series of blades and a motor that rotates the series of blades. The door separates the flight deck from a passenger entry area. The fan includes a rotating assembly with blades configured to direct air from the passenger entry area into the flight deck. The airflow provided by the fan increases an air pressure within the flight deck. For example, the airflow pushes air from the passenger entry area into the flight deck, which increases the pressure within the flight deck. The fan is configured to pressurize the flight deck to assure a positive pressure differential exists between the flight deck and other air volumes (e.g., passenger entry area) within the airplane. The positive pressure within the flight deck assures the air flow and leakage air flows are in the out direction from the flight deck to assure that no smoke or toxic gases penetrate the flight deck from outside the flight deck sources. The pressure within the flight deck may be released via a vent valve positioned in the door. Optionally, the vent valve is triggered when an air pressure within the flight deck is above a predetermined threshold. In response to the increased air pressure, the vent valve releases air from the flight deck into the passenger entry area. As air is released from the flight deck, the air pressure within the flight deck is reduced.

In at least one embodiment, the fan includes a shield configured to obstruct external projectiles from damaging the fan from the passenger entry area. For example, the shield includes one or more metal or ceramic plates that are overlaid on the fan at the passenger entry area. The metal and/or ceramic plates are configured to block the external projectile from entering the fan and/or absorb an impact and/or stop penetration of an external projectile into the fan. Non-limiting examples of the external projectile can be a bullet, a hardened ball point pen, a blade, a shank, and/or the like. The shield is positioned such that a gap is formed between the shield and the door. The gap is configured to allow air to enter through the gap and into the fan.

The fan may include a filter situated between the fan and the shield. The filter is configured to remove particles received from the air received from the passenger entry area. For example, the particles can represent dust, smoke, soot, fumes, pollen, bacteria, and/or the like. Optionally, the filter is configured to allow particles that have a particular diameter, such as approximately 0.3 micrometers to enter the fan. For example, the filter may represent a high efficiency particulate air (HEPA) filter, which removes over 90% of particles from the air of the passenger entry area.

The fan may be activated based on instructions received from an environmental control system (ECS) or a user interface of the flight deck. The instructions may include electrical energy, which provides power to the fan 204. Optionally, the instructions may represent a binary and/or analog signal configured to activate the fan 204. The ECS may include a plurality of sensors positioned throughout the flight deck and the passenger entry area. For example, the ECS may include a sensor configured to detect smoke (e.g., optical sensor, ionization sensor, carbon monoxide sensor). In another example, the ECS may include one or more sensors configured to detect particles hazardous to pilot health such as sulfur oxide, ammonia, organic compounds, and the like. When the ECS detects smoke and/or hazardous particles, the ECS activates the fan. Additionally or alternatively, the pilots may activate the fan manually using a user interface.

Optionally, a plurality of fans are mounted within the door. For example, the door includes first and second fans. The second fan may be utilized to provide additional airflow based on the operation of the first fan.

FIG. 1A illustrate a view of a portion of an internal cabin 100 of an aircraft 108, according to an embodiment of the present disclosure. The internal cabin 100 of the aircraft 108 includes a flight deck 102 and a passenger entry area 104. The passenger entry area 104 corresponds to an area proximate to a forward entry door 109. The internal cabin 100 is partitioned into different control volumes with managed air flows from pressure control volumes. For example, the flight deck 102 from which pilots control the aircraft is one of the control volumes. The forward entry door 109 provides an entry way into the aircraft 108 for passengers and/or crew. For example, the passenger entry area 104 represents a region of the internal cabin 100 for passengers and/or crew to enter the aircraft 108 through the forward entry door 109. From the passenger entry area 104, the passengers can proceed to a plurality of seats 110. Alternatively, from the passenger entry area 104, the crew can proceed into the flight deck 102, the galley, or other positions within the aircraft 108.

The flight deck 102 and the passenger entry area 104 are separated by a partition 106 and/or wall. The passenger entry area 104 represents at least a portion of a passenger compartment. For example, the passenger entry area 104 includes a plurality of seats 110 for the passengers of the aircraft 108. The flight deck 102 includes an instrument panel (not shown) that enables the pilot to fly the aircraft 108. The instrument panel includes a user interface that receives inputs from the pilot to activate different devices (e.g., a fan 204 shown in FIGS. 2-3). The user interface may include one or more devices for interacting with the pilot, such as: a keyboard, a mouse, a touchpad, one or more physical buttons, a touch screen, and the like.

FIG. 1B illustrates a lateral view of the internal cabin 100 of the aircraft 108, according to an embodiment of the present disclosure. The internal cabin 100 may also include a cargo hold 112. The cargo hold 112 may extend over a portion of the aircraft 108.

The flight deck 102 includes an environmental control system (ECS) 114. The ECS 114 may include one or more sensors 116. During operation of the aircraft 108, situations can occur where air in the control volume of the flight deck 102 can include smoke or other toxic gas. The one or more sensors 116 may measure an air pressure, detect smoke, detect hazardous fumes, abnormalities in the ambient air, and the like in the flight deck 102. The ECS 114 may be operably coupled to the instrument panel and/or other systems within the aircraft 108 (e.g., the fan 204 shown in FIGS. 2-3).

FIG. 2A illustrates an exterior view of a door 202 as viewed from the passenger entry area 104, according to an embodiment of the present disclosure. The partition 106 separates the flight deck 102 from the passenger entry area 104. The partition 106 includes the door 202. The door 202 includes a peephole 208 that allows a pilot to view the passenger entry area 104 from the flight deck 102. As shown in FIG. 2A, the door 202 faces the passenger entry area 104.

FIG. 2A includes the fan 204 as viewed in the passenger entry area 104. The fan 204 is mounted within the door 202. For example, the fan 204 is recessed relative to the surface area of the door 202 facing the passenger entry area 104. The fan 204 may be recessed within the surface area of the door 202. A distance of the recess within the surface area of the door 202 is based on a thickness of the fan 204 and clearance between the door 202 and the partition 106. For example, the recess enables the door 202 to open and be adjacent to the partition 106 without being obstructed by the fan 204.

The fan 204 is shown having a shield 206. The shield 206 is positioned adjacent to the passenger entry area 104. The shield 206 conceals the fan 204 such that the fan 204 is not visible when viewed from the passenger entry area 104. For example, the shield 206 blocks a line of sight between blades of the fan 204, which prevents a passenger of the passenger entry area 104 seeing into the flight deck 102. The shield 206 is made of metal (e.g., steel, titanium), one or more ceramic plates (e.g., boron carbide, silicon carbide ceramic), or any such material capable of protecting the fan from an external projectile (e.g., bulletproof, a hardened ball point pen, a blade, a shank) from the passenger entry area 104. The shield 206 is configured to absorb an impact and/or stop penetration of an external projectile into the fan 204. The shield 206 is configured to maintain an impervious separation between the flight deck 102 and the passenger entry area 104.

The shield 206 is positioned within the recess of the door 202. A position of the shield 206 relative to the surface area of the door 202 is configured such that a gap forms between the surface area of the door 202 and the shield 206. The shield 206 is coupled to the fan 204 such that the gap forms between the shield 206 and the door 202. Responsive to activation of the fan 204, air flows through the gap and into the fan 204 from the passenger entry area 104. For example, the gap allows air to flow into the fan 204 without the need for apertures and/or holes along a surface of the shield 206.

FIG. 2B, illustrates an interior view of a door 202 as viewed from flight deck 102, according to an embodiment of the present disclosure. The door 202 includes the fan 204 within the flight deck 102. The fan 204 is mounted within the door 202, and can extend within the flight deck 102.

FIG. 3 illustrates a front view of a rotor assembly 300 of the fan 204 as seen from the passenger entry area 104. The shield 206 is shown being transparent to view the fan 204 behind the shield 206. The rotor assembly 300 has blades 302 that are angled to direct air from the passenger entry area 104 into the flight deck 102. For example, when the fan 204 is activated, the blades 302 rotate to increase the pressure in the flight deck 102 relative to the passenger compartment. The speed of the fan is adjustable (e.g., via the ECS) to control the air flow rate.

For example, the fan 204 rotates the blades such that air is propelled from the passenger entry area 104 into the fan 204 at approximately 2.28 meters per second. Based on the rotation, the airflow from the fan 204 is at approximately 1.8 meters per second. The airflow received from the fan 204 increases the air pressure within the flight deck 102 by approximately 0.002 inches of water gauge (IWG) relative to the passenger entry area 104. Additionally or alternatively, the fan 204 may be rotated at a lesser or greater rate to push the air at a different rate.

The fan 204 may include an external light source 304. The external light source 304 may be one or more light emitting diodes (LEDs), incandescent bulbs, compact fluorescent lamps, and the like. The external light source 304 is positioned along a surface area of the shield 206, such that the external light source 304 can be viewed from the passenger entry area 104. The external light source 304 is configured to indicate an operation of the fan 204, a status of the filter, a condition within the flight deck 102, or a combination thereof. The external light source 304 can be activated by a control circuit 308, and/or the ECS 114.

For example, the external light source 304 is activated to indicate the operation and/or activation of the fan 204. The fan 204 is activated by the ECS 114, the user interface of the instrument panel, or the control circuit 308. The activation of the fan 204 is based on instructions received from the ECS 114, the user interface, or the controller circuit 308. The instructions may include electrical energy or an activation signal (e.g., binary signal, analog signal), which activates the rotor assembly 300 to rotate the blades 302. Responsive to the activation of the rotor assembly 300, the external light source 304 is turned on to indicate the operation and/or activation of the fan 204.

In another example, the external light source 304 indicates a status of a filter, such as when to replace the filter. The control circuit 308 may be operably coupled to a memory that indicates an operational life of the filter. The operational life represents a length of time the filter is effective without disrupting the operation of the fan 204. For example, over time particles are collected within the filter and can disrupt air entering the fan 204. The control circuit 308 is configured to track an operational length of time the fan 204 is operating. The control circuit 308 compares the operational length with the operational life of the filter. When the operational length is over the operational life, the control circuit 308 instructs the external light source 304 that indicates to replace the filter to activate.

Additionally or alternatively, the external light source 304 indicates a condition within the flight deck 102. For example, the fan 204 includes multiple external light sources 304, each such that may correspond to conditions within the flight deck 102, such as fire, fumes, and/or the like. The ECS 114 monitors the flight deck 102 and detects from the sensor array 116 (FIG. 1) when smoke and/or fumes are detected within the flight deck 102. For example, the ECS 114 sends instructions (e.g., electrical energy, activation signal) to activate a first external light source 304 representing fire when the smoke is detected within the flight deck 102. In another example, the ECS 114 sends instructions to activate a second external light source 304 representing fumes when the fumes are detected within the flight deck 102.

As used herein, the term "control circuit," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control circuit 308 may be or include one or more processors that are configured to control operation of the fan 204, as described above.

The control circuit 308 is configured to execute a set of instructions that are stored in one or more data storage units or elements (such as one or more memories), in order to process data. For example, the control circuit 308 may include or be coupled to one or more memories. The data storage units may also store data or other information as desired or needed. The data storage units may be in the form of an information source or a physical memory element within a processing machine.

The set of instructions may include various commands that instruct the control circuit 308 to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the one or more control or processing units may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 4:
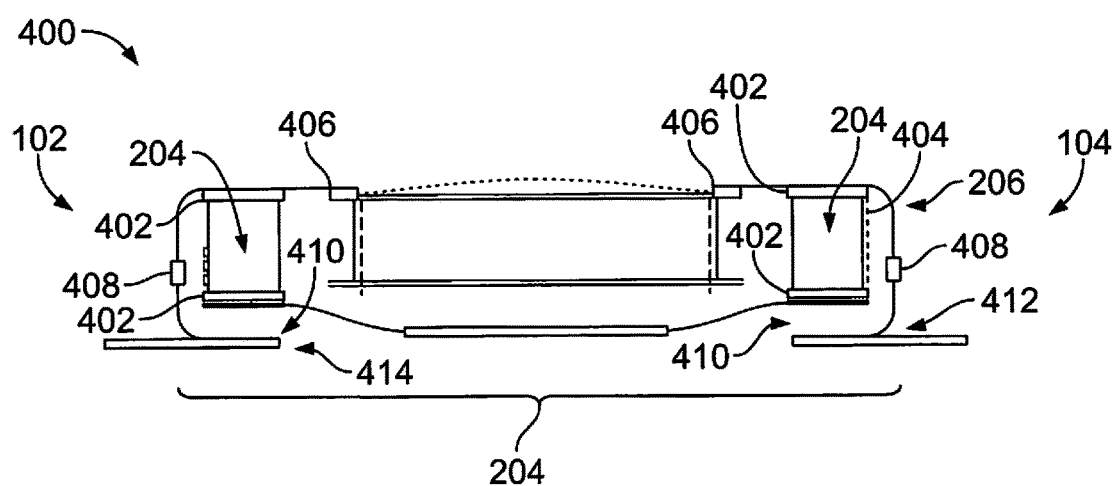
FIG. 4 illustrates a cross sectional view of a fan within a door interposed between a flight deck and a passenger entry area, according to an embodiment of the present disclosure.

FIG. 4 illustrates a cross sectional view of the fan 204 within the door 202 (shown in FIG. 2) situated between the flight deck 102 and the passenger entry area 104, according to an embodiment of the present disclosure. The fan 204 extends within the door 202. The fan 204 has fasteners 408 that hold the shield 206 to the rotor assembly 300. The fasteners 408 are positioned on a surface of the shield 206 and the fan 204 at the flight deck 102. For example, the fasteners 408 extend from a surface of the fan 204 in the flight deck 102 to the shield 206. The fasteners 408 are configured such that the fasteners 408 are accessible from the flight deck 102. For example, the fasteners 408 are configured such that the shield 206 is not able to be removed (e.g., unscrewed) from the passenger entry area 104. The fasteners 408 are configured such that the shield 206 can be removed when the fasteners 408 are removed (e.g., unscrewed) from the flight deck 102. Responsive to the fasteners 408 being removed from the flight deck 102, provides access to a filter 404 and/or the fan 204 at the passenger entry area 104. The fan 204 is shown sealed within the door using a plurality of seals 402. For example, the seals 402 are configured to hold the fan 204 at a position within the door 202. Optionally, the seals 402 include silicone.

The fan 204 may include elastomeric mounts 406. The elastomeric mounts 406 are configured to dampen sound emitted by the fan 204. For example, the elastomeric mounts 406 may be formed by rubber, silicon, polymer, or any suitable material that dampens vibration. During operation of the fan 204, the fan 204 oscillates at a set frequency (e.g., natural frequency). The elastomeric mounts 406 are configured to have a viscoelasticity at the set frequency, such that the elastomeric mounts 406 absorb the oscillation of the fan 204. The absorption of the oscillation by the elastomeric mounts 406 reduces sound emitted from the fan 204 at the set frequency.

A gap 412 extends between the shield 206 and the door 202 in the passenger entry area 104. For example, responsive to the shield 206 being coupled to the fan 204 via the fasteners 408, the gap 412 is formed between the shield 206 and the door 202. The gap 412 allows air to flow into the fan 204 from the passenger entry area 104. For example, as the blades 302 rotate air is directed from the passenger entry area 104 through the gap 412 and into the fan 204. The airflow from the fan 204 is received at the flight deck 102, which increases an air pressure within the flight deck 102.

Optionally, air pressure within the flight deck 102 can be too high based on the airflow from the fan 204. To reduce the air pressure, a vent valve 410 can be positioned within the door 202. The vent valve 410 can extend between the gaps 412, 414 through the door 202. The gap 414 extends between the fan 204 and the door 202 in the flight deck 102. The vent valve 410 is configured to adjust the air pressure within the flight deck 102 through the gaps 412, 414. For example, the airflow provided by the fan 204 increases the air pressure within the flight deck 102. As used herein, adjusting air pressure by the vent valve 410 means decreasing the air pressure within the flight deck 102. The vent valve 410 provides a channel for air to flow from the flight deck 102 at the gap 414 into the passenger entry area 104 through the gap 412. For example, the airflow from the fan 204 creates an air pressure differential between the flight deck 102 and the passenger entry area 104. The differential pushes air through the gap 414 from the flight deck 102 and into the vent valve 410. The air is released through the gap 412 into the passenger entry area 104, which reduces the air pressure within the flight deck 102. Additionally or alternatively, the vent valve 410 may include a safety valve configured to obstruct the channel of the vent valve 410 at the gap 414 until the air pressure of the flight deck 102 is above a predetermined threshold. For example, the predetermined threshold may be the differential (e.g., at 0.05 IWG) between the flight deck 102 and the passenger entry area 104. Responsive to the air pressure within the flight deck 102 being above the predetermined threshold, the safety valve is released allowing air to flow within the vent valve 410.

Figure 5:
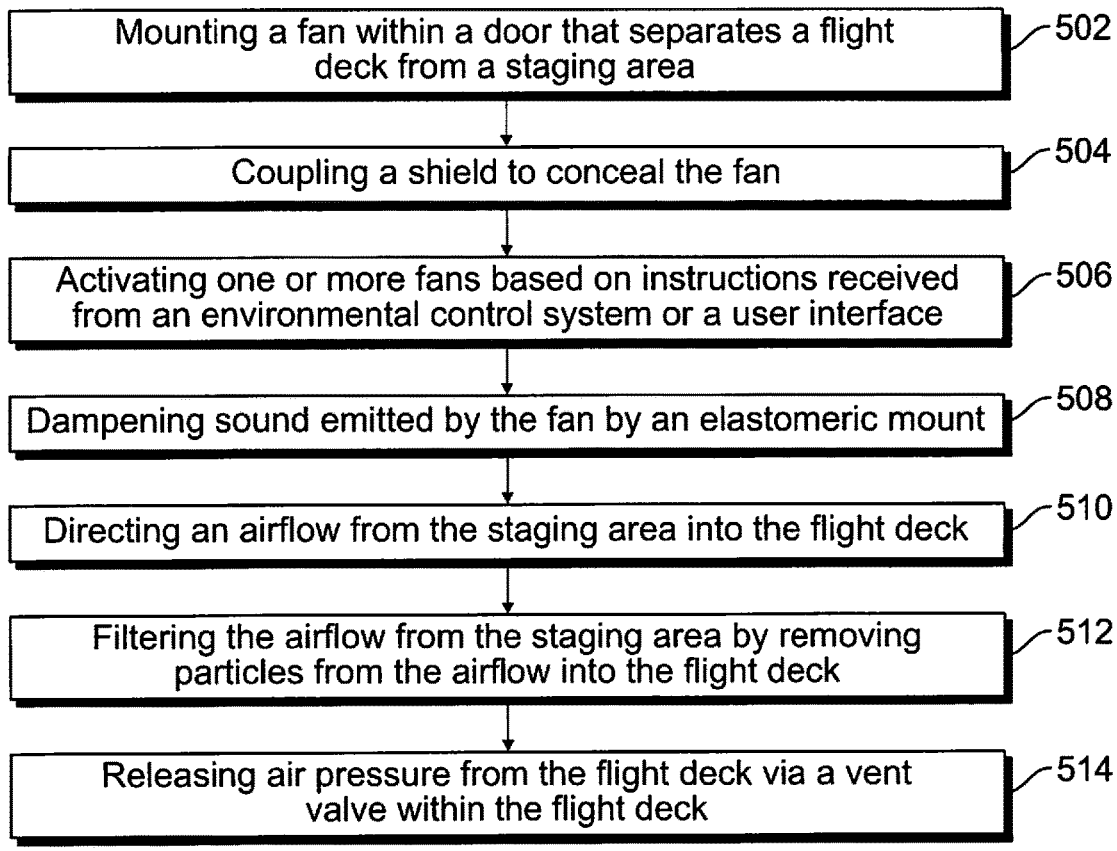
FIG. 5 illustrates a flow chart of a method to provide airflow into a flight deck, according to an embodiment of the present disclosure.

FIG. 5 illustrates an embodiment of a flow chart of a method 500 to provide airflow into the flight deck 102. The method 500, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, or certain steps may be performed in a different order.

Beginning at 502, the fan 204 is mounted within the door 202 that separates the flight deck 102 from the passenger entry area 104. For example, the fan 204 is mounted within the door 202 utilizing a plurality of seals 402. Optionally, the fan 204 is recessed relative to the surface area of the door 202 facing the passenger entry area 104.

At 504, the shield 206 is coupled to at least one fan 204. For example, the shield 206 is positioned adjacent to the passenger entry area 104. The shield 206 is configured to cover a surface area of the fan 204 of the passenger entry area 104. The shield 206 blocks a line of sight between of the blades 302 of the fan 204, which prevents a passenger of the passenger entry area 104 seeing into the flight deck 102 through the shield 206. The shield 206 is further configured to absorb an impact and/or stop penetration of an external projectile into the fan 204.

At 506, one or more fans are activated based on instructions received from the ECS 114, the user interface, the control circuit 308. The ESC 114 and the user interface are operably coupled to the fan 204. For example, the ECS 114 monitors the flight deck 102 and detects from the sensor array 116 when smoke and/or fumes are detected within the flight deck 102. When ECS 114 detects smoke and/or fumes within the flight deck 102, the ECS 114 sends instructions to activate the fan 204. In another example, the user interface of the instrument panel receives a selection from the pilot to activate the fan 204. The activation by the ESC 114 and/or the user interface provides power to the fan 204, which rotates the blades 302 of the fan 204.

Figure 6:
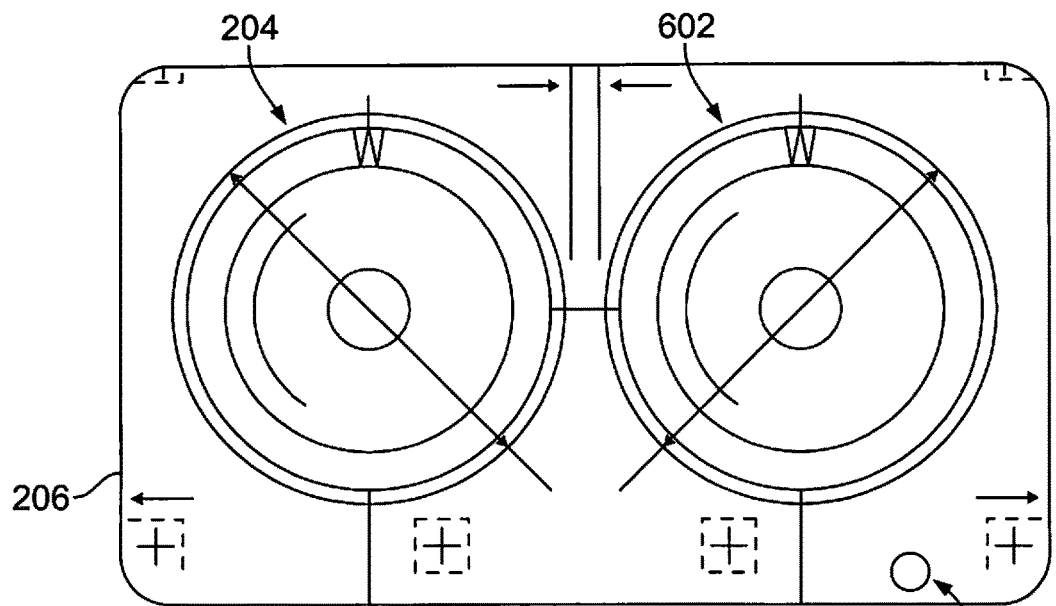
FIG. 6 illustrates a front view of first and second fans within a door interposed between a flight deck and a passenger entry area, according to an embodiment of the present disclosure.

Alternatively, more than one fan is mounted within the door 202. FIG. 6 illustrates a front view of first and second fans 204, 602 within the door 202 interposed between the flight deck 102 and the passenger entry area 104, according to an embodiment of the present disclosure. The second fan 602 is shown at a position adjacent to the first fan 204. Optionally, in other embodiments, other arrangements of the second fan 602 relative to the first fan 204 are possible. For example, the first fan 204 may be spaced apart from the second fan 602.

The shield 206 is shown expanded to be overlaid over the second fan 602. The shield 206 is configured to extend along a surface of the second fan 602 of the passenger entry area 104. For example, the shield 206 is configured to cover a surface area of the second fan 602 of the passenger entry area 104. The shield 206 blocks a line of sight between blades of the second fan 602, which prevents a passenger of the passenger entry area 104 seeing into the flight deck 102. Additionally, the shield 206 is configured to absorb an impact and/or stop penetration of an external projectile into the first and second fans 204, 602. The gap 412 extends along the shield 206 between the first and second fans 204, 602. For example, responsive to activation of the first and/or second fans 204, 602, airflows into the gap 412 from the passenger entry area 104 into the first and/or second fans 204, 602. passenger entry area The second fan 602 can be utilized concurrently with the first fan 204. Optionally, the second fan 602 is activated when the first fan 204 fails and/or is not operational. For example, the ESC 114 activates the first fan 204. The ESC 114 measures the air pressure before and after activation of the first fan 204. The ESC 114 compares the air pressure before and after the activation of the first fan 204 with a predetermined threshold. The predetermined threshold may represent a percentage and/or magnitude of change of the air pressure within the flight deck 102. When the air pressure after activation is below the predetermined threshold, the ESC 114 activates the second fan 602.

At 508, sound emitted by at least one of the fans 204, 602 is dampened by the elastomeric mount 406. For example, during operation of the fan 204, the fan 204 oscillates at the set frequency. The elastomeric mounts 406 are configured to have a viscoelasticity at the set frequency, such that the elastomeric mounts 406 absorb the oscillation and reduce sound emitted from the fan 204.

At 510, an airflow from the passenger entry area 104 is directed into the flight deck 102. For example, the fan 204 rotates the blades 302 such that air is propelled from the passenger entry area 104 into the fan 204. The air is exhausted within the flight deck 102 creating an airflow from the passenger entry area 104 into the flight deck 102.

At 512, the airflow from the passenger entry area 104 is filtered by removing particles from the airflow into the flight deck 102. For example, the filter 404 represents a fibrous material that is configured to block particles within the air from passing through the filter from the gap 412. The particles remain within the filter 404 as air passes through the filter 404.

At 514, air pressure from the flight deck 102 is released via the vent valve 410 within the flight deck 102. For example, the airflow provided by the fan 204 increases the air pressure within the flight deck 102. The vent valve 410 provides a channel for air to flow from the flight deck 102 into the passenger entry area 104. For example, the airflow creates an air pressure differential between the flight deck 102 and the passenger entry area 104. The differential pushes air from the flight deck 102 through the vent valve 410 to the passenger entry area 104, which reduces the air pressure within the flight deck 102.

Figure 7:
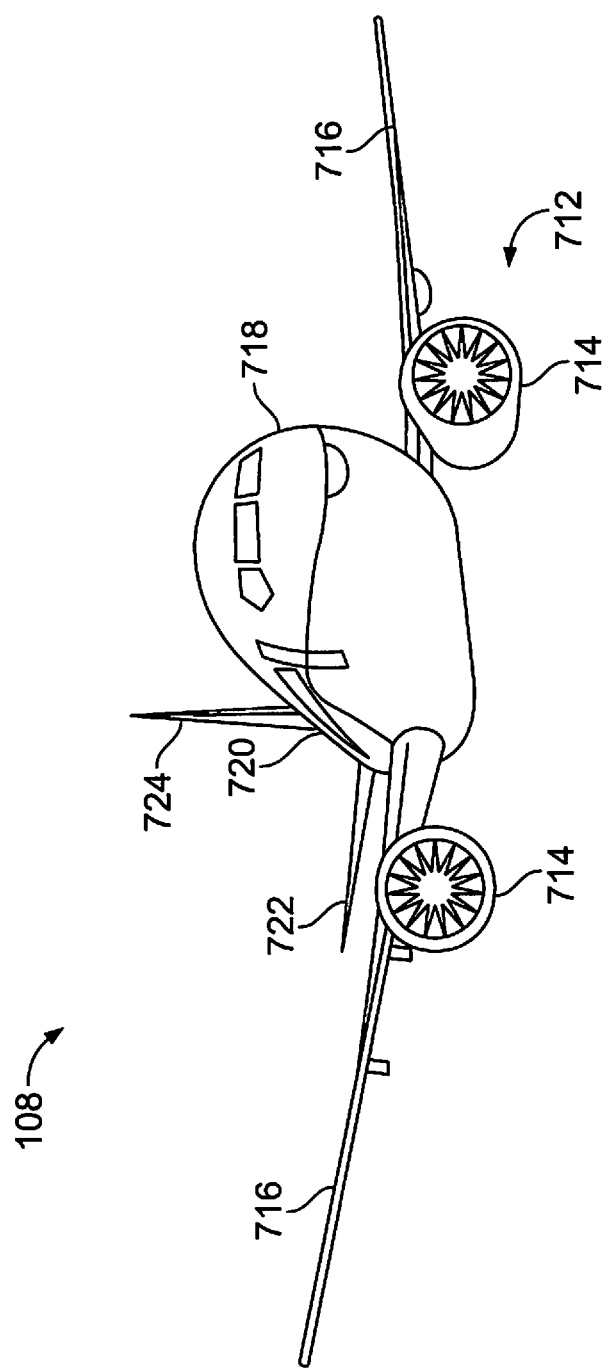
FIG. 7 illustrates a perspective front view of an aircraft, according to an embodiment of the present disclosure.

FIG. 7 illustrates a perspective front view of an aircraft, according to an embodiment of the present disclosure. The aircraft 108 includes a propulsion system 712 that may include two turbofan engines 714, for example. Optionally, the propulsion system 712 may include more engines 714 than shown. The engines 714 are carried by wings 716 of the aircraft 108. In other embodiments, the engines 714 may be carried by a fuselage 718 and/or an empennage 720. The empennage 720 may also support horizontal stabilizers 722 and a vertical stabilizer 724.

The fuselage 718 of the aircraft 108 defines an internal cabin, which include a cockpit (e.g., flight deck 102), one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class/section divider assemblies, as described herein.

Alternatively, instead of an aircraft, embodiments of the present disclosure may be used with various other vehicles, such as automobiles, buses, locomotives and train cars, sea craft, spacecraft, and the like.

As described above, embodiment of the present disclosure provide systems and methods to retrofit an aircraft ventilation system to have a fan that meets security requirements (e.g., the shield 206) and provide breathable air in a flight deck in the event of a fire.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for providing airflow in a vehicle, the system comprising:
    a fan mounted within a door separating a first area from a second area, the fan being configured to direct airflow from the second area into the first area; and
    a shield positioned adjacent to the fan and facing the second area, the shield configured to conceal the fan.

2. The system of claim 1, wherein the airflow increases an air pressure within the first area.

3. The system of claim 2, wherein the door includes a vent valve configured to reduce the air pressure within the first area.

4. The system of claim 1, further comprising a filter situated between the shield and the fan within the door, the filter configured to remove particles from the airflow.

5. The system of claim 4, wherein the filter is a high efficiency particulate air (HEPA) type filter.

6. The system of claim 1, wherein the fan includes a light source configured to indicate at least one of operation of the fan, a status of a filter, or a condition within the first area.

7. The system of claim 1, wherein the fan is operably coupled to an environmental control system (ECS), the fan being configured to activate based on instructions received from the ECS.

8. The system of claim 1, wherein the first area includes a user interface, the fan being configured to activate based on instructions received from the user interface.

9. The system of claim 1, further comprising a second fan mounted within the door configured to direct airflow from the second area into the first area, wherein the shield is configured to conceal both the first fan and the second fan.

10. The system of claim 1, further comprising an elastomeric mount configured to dampen sound emitted by the fan.

11. The system of claim 1, wherein the shield is a metal or ceramic plate configured to absorb an impact or stop penetration of an external projectile into the fan.

12. A method for providing airflow in a vehicle, the method comprising:
    mounting a fan within a door that separates a first area from a second area, wherein the fan is coupled to a shield positioned adjacent to the second area, and wherein the fan is configured to direct an airflow from the second area into the first area.

13. The method of claim 12, wherein the directing operation includes adjusting an air pressure within the first area.

14. The method of claim 13, further comprising releasing air pressure from the first area via a vent valve positioned on the door.

15. The method of claim 12, further comprising filtering the airflow from the second area by removing particles from the airflow into the first area.

16. The method of claim 12, further comprising activating a light source that indicates at least one of operation of the fan, a status of a filter, or a condition within the first area.

17. The method of claim 12, further comprising activating the fan based on instructions received from an environmental control system or a user interface.

18. The method of claim 12, further comprising activating a second fan mounted within the door to direct airflow from the second area into the first area, wherein the shield is configured to conceal the second fan.

19. The method of claim 12, further comprising dampening sound emitted by the fan by an elastomeric mount.

20. A method for providing airflow in a vehicle, the method comprising:
   causing a fan to direct airflow from a second area to a first area, wherein the fan is within a door that separates the first area from the second area, and wherein the fan is coupled to a shield positioned adjacent to the second area.

* * * * *